United States Patent [19]

McBride et al.

[11] Patent Number: 4,726,141
[45] Date of Patent: Feb. 23, 1988

[54] FISHING ROD AND REEL CARRYING CASE

[76] Inventors: Charlie J. McBride, P.O. Box 2101, Sumter, S.C. 29151; Kenneth M. Charles, 1337 Covent Garden, Sumter, S.C. 29150

[21] Appl. No.: 62,615

[22] Filed: Jun. 16, 1987

[51] Int. Cl.$^4$ .............................................. A01K 97/08
[52] U.S. Cl. .................................... 43/26; 206/315.11
[58] Field of Search ....................... 43/26; 206/315.11

[56] References Cited

U.S. PATENT DOCUMENTS

| 2,854,775 | 10/1958 | Kleckley | 43/26 |
| 3,575,327 | 4/1971 | Harrison | 43/26 |
| 3,674,190 | 7/1972 | Wright | 43/26 |
| 3,772,819 | 11/1973 | Ratzlaff | 43/26 |
| 3,972,144 | 8/1976 | Geisler | 43/26 |
| 4,136,478 | 1/1979 | Wycosky | 43/26 |
| 4,170,801 | 10/1979 | Ward | 43/26 |
| 4,301,898 | 11/1981 | Plough | 206/315.11 |
| 4,546,877 | 10/1985 | Evans | 206/315.11 |

Primary Examiner—Gene P. Crosby
Attorney, Agent, or Firm—Dowell & Dowell

[57] ABSTRACT

A carrying case for one or two assembled fishing rods and reels which includes a pair of pouches of flexible material which are connected along an extended midseam with each pouch having oppositely oriented carrying handles and an opening through which the end of a rod and the reel is selectively received and which openings are closable around the rods by interengagable surface closures. The carrying case permits one or two rods and reels to be selectively carried or stored and yet the reels shielded from the weather and other environmental conditions without the necessity of removing the reels from the rods.

6 Claims, 3 Drawing Figures

FISHING ROD AND REEL CARRYING CASE

BACKGROUND OF THE INVENTION

1. Field of the Invention

This invention generally relates to protective covers and carriers for fishing rods and reels and more specifically to a protective covering and carrier which may be used to selectively house one or two fishing rods and reels in such a manner that the reels and the handle end of the rods will be protectively housed while the outer ends of the rods will extend from the carrier. The carrier includes openings into two separate pouches which are selectively closable by interengagable VELCRO-like fasteners so that the edges of the carrier are tightly closed in sealed engagement about the shaft of the rods. The carrier also includes a pair of handles each of which is connected directly to one of the two separate pouches and on diametrically opposite sides of the carrier. In this manner, the rods may either be carried by a single handle and thereby be positioned in a vertical orientation with respect to one another or the carrier may be folded and carried with both handles whereby the rods and reels are maintained in relatively side by side alignment with respect to one another. The handles also function to allow the rods to be suspended in a general common vertical plane in storage with a single one of the handles being suspended from a wall or other support surface. Further, the handles are attached to the pouches in such a manner that the primary distribution of weight of the rods and reels is to the rear or back side of the carrier thereby causing the tip portion of the rods to be inclined upwardly and outwardly with respect thereto so that the possibility of accidentally poking or gouging some other person or an object with the tips of the rods is effectively prevented.

2. History of the Related Art

The proper caring of fishing rods and reels not only preserves the life of such equipment but also enables the fisherman to have trouble free operation of the equipment. All too often, people are inclined to simply store fishing rods and reels in an open condition in a garage, closet or other area where the equipment is subject to abuse. In addition, fishing reel mechanisms are adversely effected by exposure to dust, dirt and moisture. Because of these problems, various kinds of protective covers have been designed for enclosing or housing fishing rods and reels so that the reels may be maintained connected to the rods during periods of non-use and so that the entire rod and reel assembly is covered and protected from dust, dirt and moisture In addition to protecting fishing rods and reels during periods of non-use and as it is commonly necessary to carry rods and reels from the home to a vehicle or boat and back again, various kinds of covers have been modified to also serve as carriers. In U.S. Pat. Nos. 2,854,775 to Kleckley, 3,575,327 to Harrison and 3,972,144 to Geisler, there are disclosed several types of generally rectangular protective cases for carrying a plurality of fishing rods and reels. In the patent to Geisler, the fishing rods are stored in elongated compartments which run generally parallel with the length of the case and the reels are covered by overlapping flaps which must be tied and secured in place. With this structure, the rods are adequately protected, however, the reels are only loosely protected by the tied flaps. Generally, it is the fishing reels which should be protected and housed more securely as the reels constitute the operating mechanism of the entire tackle assembies and the components which require the most maintenance.

In the patent to Harrison, a plurality of reels and rods are tied to a rectangular covering material and thereafter the entire sheet or casing rolled upon itself. Not only is such a configuration awkward to handle, but the case requires that each rod be tied in place at three separate locations prior to the case being rolled upon itself. Thereafter, to secure the ends of the case in closed relationship, separate ties are provided to wrap the entire casing and secure the same in its rolled configuration. With this type of structure, however, and even when fully closed, the ends of the case remain open to the elements and dirt and dust can enter into the case.

In the patent to Kleckley, the rods and reels are totally enclosed within a plurality of parallel pouches which are interconnected along a rectangular casing. Each of the storage compartments includes a zippered closure which permits each compartment to be completely sealed. After the fishing tackle has been placed within the compartments, the casing is rolled upon itself and thereafter tied by using separate straps which are attached to the case.

In each of the foregoing prior art examples, a great deal of effort is required to secure the fishing rods and reels within the carrying cases and it is thereafter necessary to roll and tie the cases themselves in order to secure the rods and reels for transportation. Also, each of the prior structures makes major provision for covering the tip or end portions of the fishing rods which portion includes no moving components or parts and which generally is not adversely effected if left uncovered. Therefore, a great deal of expense is required to provide the additional casing material to encompass the entire fishing rods while at the same time, as in the references to Geisler and Harrison, the reels are only loosely covered or wrapped by portions of the carrying case.

In U.S. Pat. No. 3,772,819 to Ratzleff, a generally rigid tubular case for carrying a plurality of fishing rods and reels is disclosed. With this structure, however, it is necessary that the reels be dismantled and removed from the fishing rods or poles prior to being placed within the carrying case. Not only is such a procedure time consuming, but in situations where the rods and reels will be used on a routine basis, a great deal of extra effort and work is required to provide adequate protective storage for the fishing equipment. Also, as the carrying case is relatively rigid, it is not only bulky to handle but cannot be easily stored when not in use.

In U.S. Pat. No. 4,546,877 to Evans, a cover and carrier for a single fishing rod is disclosed wherein the rod portion is inserted within a fairly rigid carrying tube while the reel is closed within a generally flexible pouch. This type of carrier is designed for a single rod and reel and has the disadvantage of not being easily collapsed or stored away when not in use. Also, additional expense is required to house the entire fishing rod. In U.S. Pat. No. 3,674,190 to Wright, another form of fishing rod carrier for carrying a plurality of fishing rods is disclosed. In this carrier, a relatively rigid central support member divides the carrier into four separate compartments in which the reels are housed. An elongated support portion for the rods extends outwardly of a flexible pouch which is closed by zippers on either side thereof and which is closed along the opening where the rods pass through by a separate strap.

Such a carrying case is not only bulky and complicated requiring both an interior supporting portion and an exterior cover portion but the rod ends are only sealed with the flexible cover by providing a separate strap. Therefore, there are several closure steps which must be taken in order to secure the reels within the carrying case.

A more simplistic type of fishing reel closure is disclosed in U.S. Pat. No. 4,136,478 to Wycosky. In this patent, a generally flexible bag is fitted over the handle portion of the rod and the reel and is closed by use of a special tie line which is secured to one of the guide eyes along the fishing rod or pole. Such a structure is inexpensive to manufacture and easily stored and collapsed when not in use. However, the structure requires the use of a separate closure member which is small and can be easily misplaced. If misplaced, the bag or pouch could not be sealed about the fishing reel. Further, the structure as disclosed would only provide a limited tightening of the pouch around the rods, and therefore, dirt and other matter could pass through to the reel mechanism.

Not only are the prior art fishing rod and reel covers and carriers somewhat bulky and not conducive to quick and simple storage, but in those cases where more than one reel and rod assembly are to be carried by a single device, such device generally requires additional support structure to either maintain the poles and reels in some type of stored position or requires that the carrier be rolled and tied in order to secure such equipment in place. All of the foregoing creates additional work and is inconvenient to the fisherman, especially in the field.

SUMMARY OF THE INVENTION

This invention is directed to a protective cover and carrying case for housing one or two fishing reels which are attached to the handle portion of fishing rods and which includes a pair of oppositely oriented and similarly shaped pouches which are secured in back to back relationship with respect to one another by a common seam and which are fully closed around the perimeter thereof except for an opening in a forward portion of each pouch which opening is of a size to permit the reels and rod handle portions to be inserted within the pouches. The openings are sealed by the use of fabric fasteners such as VELCRO strips which are secured to the fabric of the pouches so that the openings may be closed about the fishing rods in such a manner as to substantially seal the openings tightly about the rods and thereby prevent dirt or debris from entering into the pouches in which the reels are housed. A pair of oppositely oriented handles are secured to each of the pouches on the opposite sides of the carrier with the handles being positioned so as to be slightly forwardly of the reels and toward the openings in the pouches when the carrier is in use so that the weight of the reels tends to rotate the tip end portion of the fishing rods into an elevated or upwardly inclined orientation. As the pouches are connected in back to back relationship, when a reel and rod is secured within each pouch, and the carrier thereafter folded so that each pouch is brought into side by side relationship so that each handle is also in side by side relationship, the reels will be disposed in the same orientation and assume a common angle of inclination with respect to a horizontal plane when being transported.

It is a primary object of the present invention to provide a protective cover and carrier for fishing rods and reels wherein the reels remain attached to fishing rods and the carrier may be utilized to support one or two fishing rods and reels with such rods and reels being simply and easily secured and locked within the carrier to prevent the reels from being exposed to dust, dirt or moisture in the environment.

It is another object of the present invention to provide a relatively inexpensive carrier for fishing rods and reels which when not in use may be simply folded upon itself and stored in a flat configuration in any out of the way area.

It is another object of the present invention to provide a fishing rod and reel carrier wherein the primary covering and protection is provided for the reels which remain attached to the fishing rods but where the rods are sealed as they extend from the carrier by the use of material locking fasteners such as VELCRO fasteners which will close the openings in the carrier in tightly sealed relationship about the rods extending therethrough.

It is another object of the present invention to provide a carrier and protective case for one or two fishing reels and rods wherein the carrier includes a pair of handles which can be utilized either singularly or jointly and which when used to transport the carrier will automatically cause the fishing rods to be inclined upwardly toward the tip portions thereof so that the tips are raised so as to not accidentally gouge or poke a person or object during the movement or the transportation of the equipment.

It is a further object of the present invention to provide a fishing rod and reel case which can be selectively used to house one or two fishing reels which remain attached to fishing rods and which includes two separate pouches which are oriented in back to back relationship along a common seam so that the carrier may be unfolded into a generally vertical plane with one fishing reel and rod assembly being disposed above the other and which thereafter may be suspended from one of two handles which are attached to either side of the carrier so that the carrier may be suspended along a common vertical plane such as the wall of a garage, closet or other storage area with the reels and rods assuming a generally vertical relationship against the supporting surface.

DESCRIPTION OF THE PREFERRED EMBODIMENT

Figure 1:
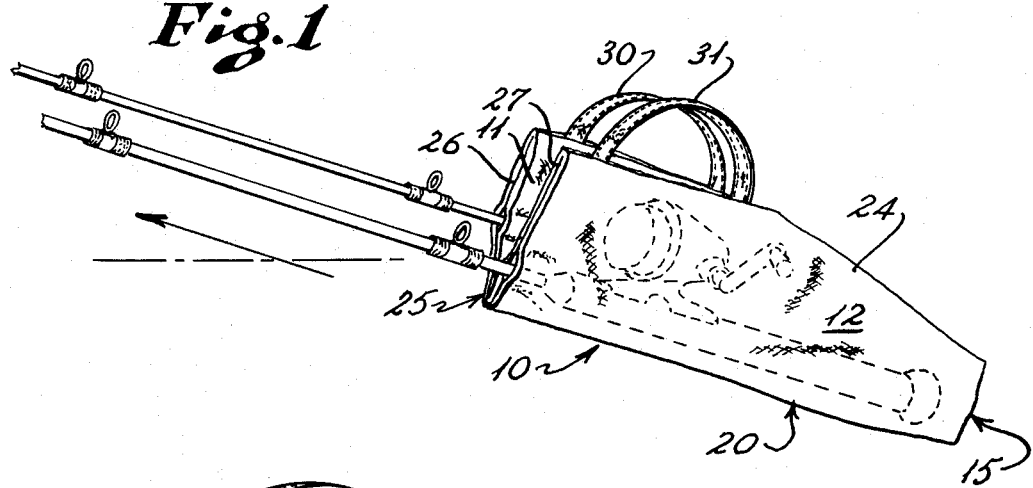
FIG. 1 is a perspective of the invention shown in carrying position with a pair of fishing rods and reels supported therein.
Figure 2:
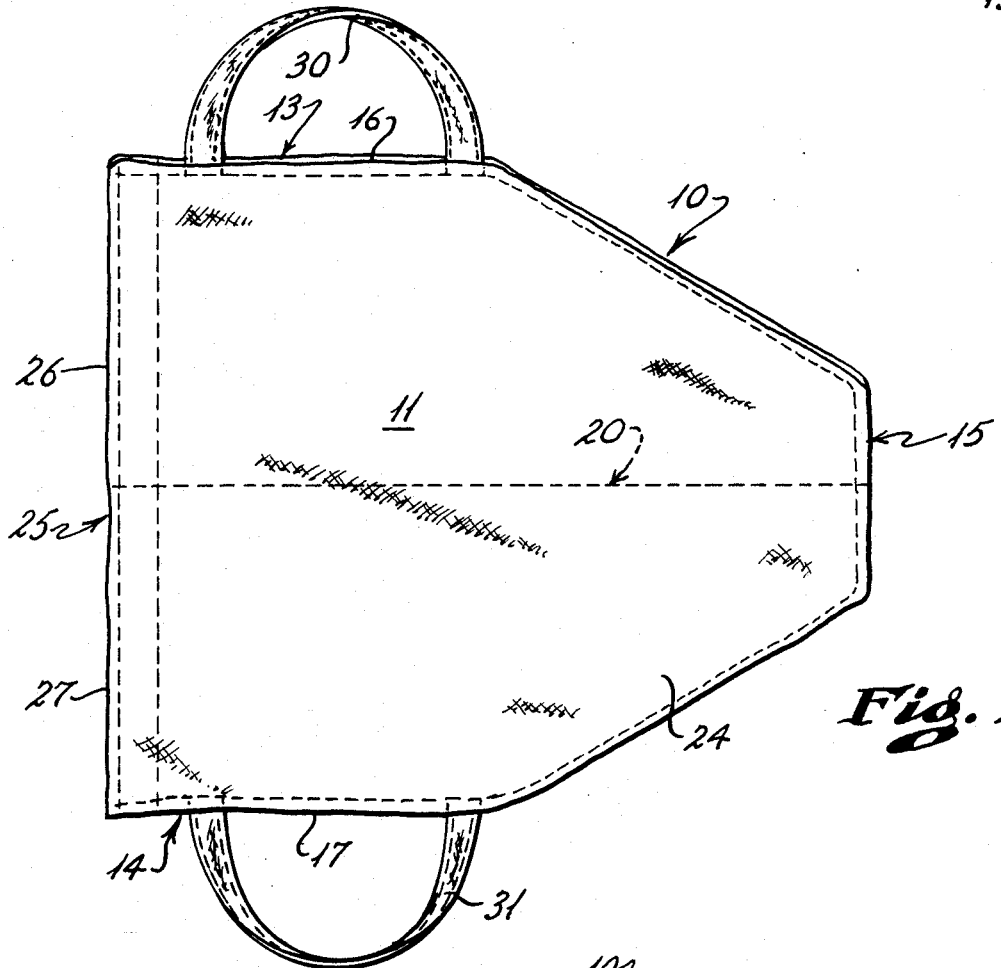
FIG. 2 is a plan view of the invention as the carrying case would be extended for suspension from a hanger or other support element.
Figure 3:
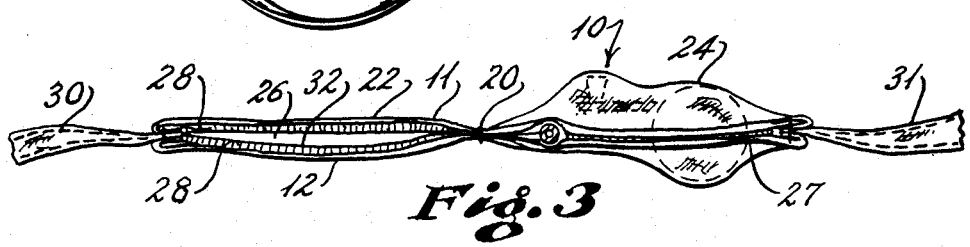
FIG. 3 is a view of the closable end of the invention with a fishing rod and reel in one of the pouches.

With continued reference to the drawings, the fishing rod carrying case 10 of the present invention includes upper and lower layers 11 and 12 which are connected along opposite side edge portions 13 and 14 and end portion 15 by suitable stitching or other closure fasteners so that the edges are in sealed relationship with respect to one another The opposite side edges include generally parallel side segments 16 and 17 and inclined portions or segments 18 and 19 which taper inwardly toward one another toward the rear edge portion 15. A generally central seam 20 is formed along the entire length and generally parallel to the generally parallel side segments 16 and 17 so as to divide the carrier into two separate and similarly sized and shaped pouches identified as 22 and 24. The forward end or edge portion 25 of the carrier or case includes a pair of openings 26 and 27 which provide access into the pouches 22 and 24. Each of the openings is provided along the interior of the carrier with opposing strips of interengagable fabric locking elements 28 which may be of the type known as VELCRO. The fabric fasteners provide a continuous closure across each of the openings which may be selectively opened or closed by someone utilizing the carrier without the requirement of additional mechanical fasteners being provided In order to transport the fishing rod and reel carrier, a pair of oppositely oriented handles 30 and 31 are secured to the generally parallel side edge segments 16 and 17 of the carrier. With particular reference to FIG. 2 of the drawings, it should be noted that the handles are generally positioned adjacent the forward portion 25 of the carrier and forwardly of the rearwardly tapering side edges 18 and 19. Due to the orientation of the handles, when a fishing rod with a reel attached thereto is positioned within one of the pouches, the reel will be positioned rearwardly of the carrier handles regardless of whether the fishing rod and reel are placed in pouch 22 or pouch 24. Because the majority of the weight of the fishing rod is normally associated with the handle and the reel mechanism, the placement of the reels within the pouch will cause the pouch to normally rotate about the handles to thereby incline the outermost or tip end portion of the rods in an upward angle when being carried. Such an upward inclination of the fishing rods will insure that the rod tips are elevated so as not to accidentally poke or engage an object or a person in front of someone utilizing the fishing rod and reel carrier of the present invention. Further, the tip portions of the rod will be prevented from directly impacting on a surface causing potential damage to the tip portion of the rod.

As discussed with respect to the prior art, one of the advantages of the present invention is that a fishing reel may remain attached to a fishing rod and secured within a protective housing without having additional separate ties or straps or mechanical fasteners to secure the reel in a relatively sealed engagement within the carrier. With the present invention, once the handle end and reel of a fishing rod and reel assembly is inserted within one of the pouches 22 or 24, it is only necessary to urge the edges of the openings 26 and 27 toward one another to thereby engage the fabric locking mechanisms or VELCRO fasteners and thereby seal the openings completely about each of the rod portions which extends outwardly of the carrier. Therefore, the fishing reels are securely enclosed and sealed from the outer environment within the pouches.

The carrier of the present invention is also designed to be easily and compactly stored when not in use. To this end, the upper and lower layers are generally constructed of a flexible material which may be leather, imitation leather, canvas or other flexible and preferrably water-resistant material The inner surface of each of the pouches is also preferably lined with a soft fabric lining 32 to protect the fishing reels inserted therein with such lining being formed of a flannel or felt-like material as desired.

The fishing rod and reel carrier 10 of the present invention is not only designed to provide a structure which permits one or two fishing rods and reels to be conveniently and quickly stored within a protective carrier, but the design also permits proper orientation of the fishing rods and reels when being transported and further permits the rods and reels to be stored in a safe and nonobstructing manner when not in use. With the handles of the carrier being positioned in diametrically opposed relationship with respect to one another, the carrier may be either transported using a single handle or the handles may be rotated into general side-by-side relationship with respect to one another so that the rods and reels carried in each of the pouches 22 and 24 are oriented adjacent to one another.

When not in use, it is possible to suspend the fishing rods and reels from the carrier by hanging the carrier from either of the handles and allowing the carrier to extend generally parallel to a vertical supporting surface such as the wall of a closet, garage or other suitable support. In this manner, the fishing rods will be retained in close proximity against the wall and therefore will not obstruct other articles in the storage area. By retaining the total length of the rods generally flush with a wall surface, the rods will not be protruding outwardly of the wall to a point where they may be accidentally caught or snagged by movement of articles or persons within the general vicinity. Also, the oppositely oriented handles will allow the outwardly extending rod portions of the fishing rod and reel assemblies to be extended either to the left or the right of a hook or other supporting mechanism thereby further facilitating the storage of the carrier and the fishing rods and reels.

In use of the fishing rod and reel carrier of the present invention, one or two rods and reels may be selectively supported by the carrier with the fishing reels and the handle portion of the rods secured and tightly sealed within one of the two pouches provided by the carrier. In order to remove the rods and reels from the pouches, it is only necessary to urge the opposite sides of the openings apart and thereafter remove the rods and reels therefrom. Thereafter and during periods of non-use, the carrier is made so as to be easily folded upon itself and stored in a very compact out of the way area. After the fishing rods and reels have been used, they may be easily and quickly stored within the carrier by inserting the handle and reel portions through the openings in the pouches and thereafter simply urging the edges of the openings into the pouches together into sealed relationship tightly about the outwardly extending portions of the fishing rods. There are no separate mechanical or other tie fasteners which must be retained or separately accounted for in order to secure and maintain reels properly housed within the carrier.

Thereafter, the rods and reels may be easily transported with the tips of the rods being upwardly oriented in a very safe manner. The carrier may be stored by being suspended from a hanger with the rods or reels being oriented either in outwardly spaced or side-by-side relationship with respect to one another depending upon the orientation which is desired.

We claim:

1. The carrying case for an assembled fishing rod and reel comprising, a pair of pouch means having first and second layers of a flexible sheet material, said pouch means being connected along an extended base dividing the pouch means into two halves, each of said pouch means having forward, side and rear edge portions, said side and rear edge portions being closed, an opening in each of said forward edge portions of said pouches, interengagable closure means in facing relationship with one another on opposite sides of said openings for selectively securing said openings in a closed position, each of said openings and each of said pouch means being of a size to receive and house the fishing reel therein with the rod extending outwardly through said openings, said openings being selectively closable about the rod portion extending therethrough, a pair of oppositely oriented handle means, one of said handle means extending outwardly from each of said side portions of said pouch means, said handle means and said pair of pouch means being extendable to lie in a common plane in a first position, and being foldable about said divided base into side-by-side relationship with said handle means in general proximity with respect to one another for carrying.

2. The carrying case of claim 1 in which each of said pouch means is lined with a soft material.

3. The carrying case of claim 1 in which said pair of handle means are positioned remotely from said rear edge portion of each of said pouch means and adjacent said forward edge portions thereof.

4. The carrying case of claim 3 in which the interengagable fabric closure means are VELCRO fasteners.

5. The carrying case of claim 4 in which each of said pouch means is lined with a soft material.

6. The carrying case of claim 4 in which each of said side edge portions of said pouch means include a first forward portion which extends generally parallel to said dividing base and a second rear portion which extends from said forward portion inwardly toward the opposing side edge portion and intersecting with said rear edge portion of said pouch means, said handle means being secured to said forward edge portions of said side edge portions.

* * * * *